Figure 1:
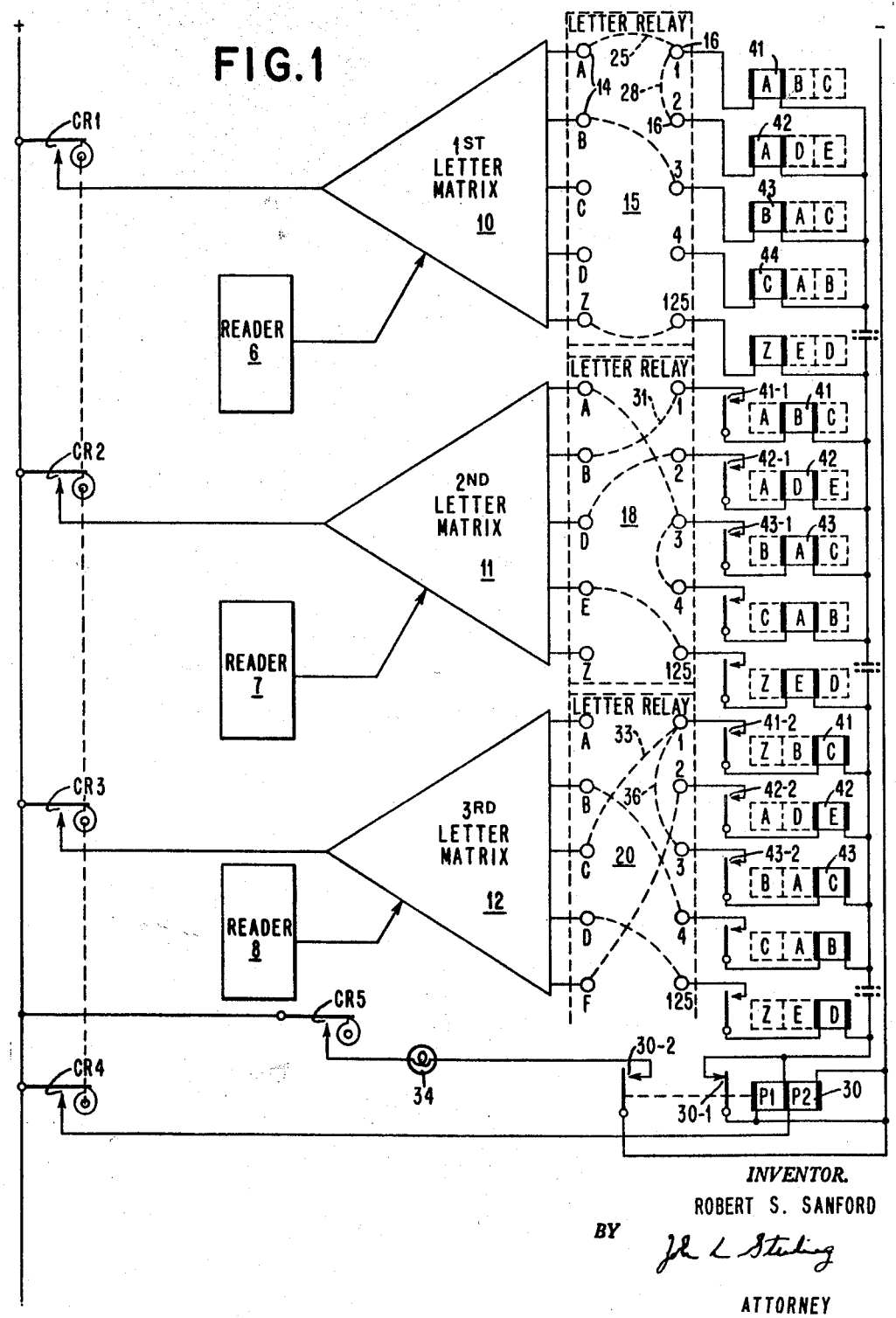
Figure 2:
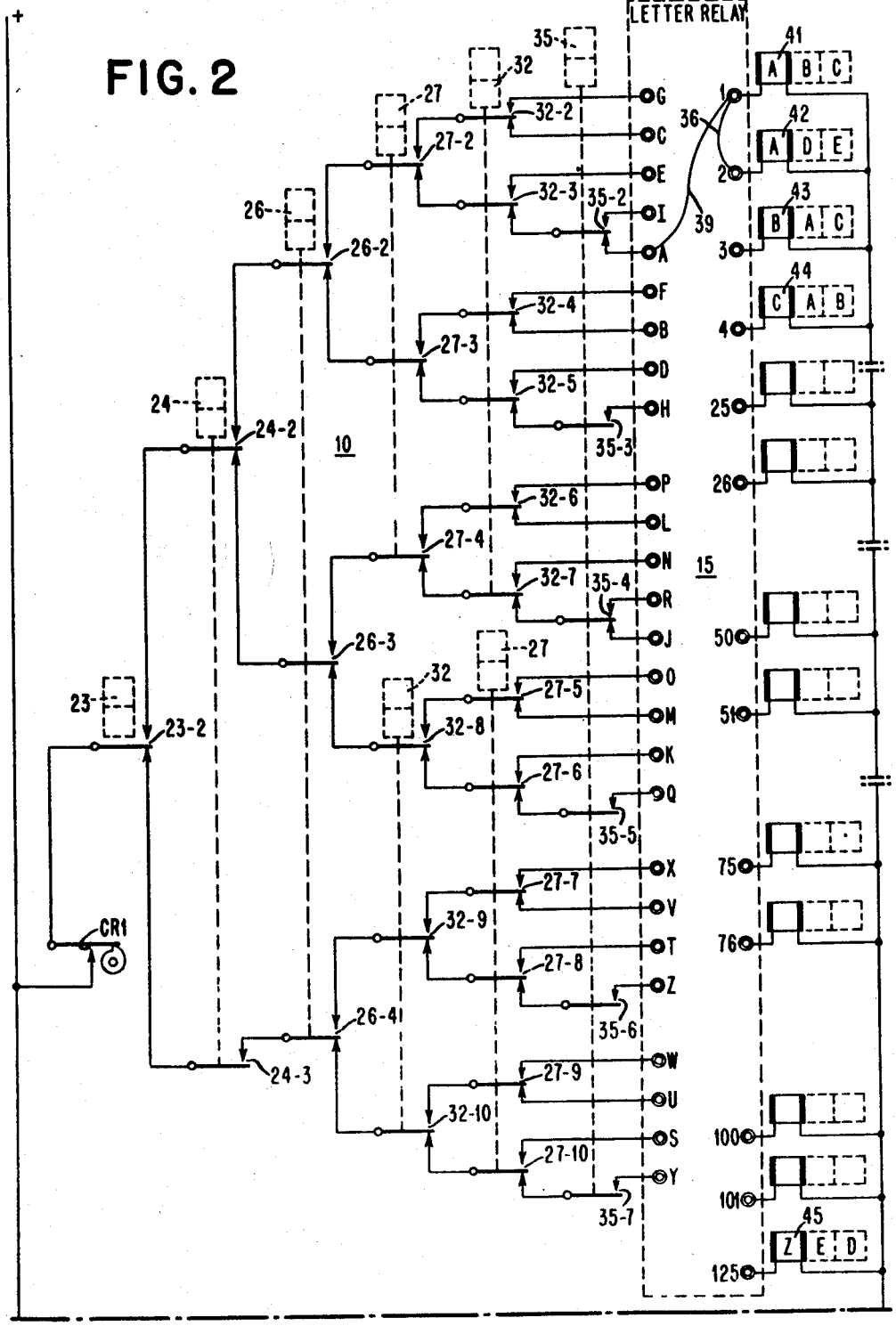

Feb. 23, 1965 R. S. SANFORD 3,171,111
RELAY SEQUENCE TESTING CIRCUIT
Original Filed March 13, 1958 5 Sheets-Sheet 5

United States Patent Office 3,171,111
Patented Feb. 23, 1965

3,171,111
RELAY SEQUENCE TESTING CIRCUIT
Robert S. Sanford, R.D. 2, Smith Road,
Poughkeepsie, N.Y.
Original application Mar. 13, 1958, Ser. No. 721,298, now Patent No. 3,035,247, dated May 15, 1962. Divided and this application Oct. 30, 1961, Ser. No. 148,682
2 Claims. (Cl. 340—252)

This invention relates to an analyzing circuit and more particularly to a circuit in which by the aid of an auxiliary test circuit a relay is capable of recognizing a preset sequence of factors. The present case is a division of my application S.N. 721,298 filed March 13, 1958, now U.S. Patent 3,035,247.

It is well known that electronic trigger circuits may have the characteristic that a combination of impulses is needed to trigger the tube, which circuit is well known as an AND circuit. It is also well known that a plurality of circuits may be completed sequentially through the contacts of a plurality of relays, one of which contacts will complete a given preselected circuit. Each of these circuits while they are broadly similar they do not necessarily require a preselected sequence of signals to effect their operation. Both require a considerable number of components with extensive wiring and are consequently expensive.

It is therefore the principal object of this invention to provide a circuit in which by the aid of an auxiliary test circuit one of a plurality of relays is selected by a predetermined sequence of signals to complete a second preselected circuit.

Another object of this invention is to provide a circuit in which one of a plurality of relays is selected by a predetermined sequence of signals.

A further object is to provide a test circuit which will detect current flow in a second circuit.

A still further object is to provide a test circuit which will detect current flow in one of a plurality of relays.

Another object is to provide an analyzing circuit which is simple and economical to build.

Other objects of the invention will be pointed out in the following description and claims and illustrated in the accompanying drawings, which disclose, by way of example, the principle of the invention and the best mode, which has been contemplated of applying that principle.

In the drawings:

FIG. 1 is a simplified schematic of a circuit using the principles of the invention.

FIGS. 2, 3, 4 and 5 when combined end to end form a more detailed showing of the circuit of FIG. 1.

Figure 6:
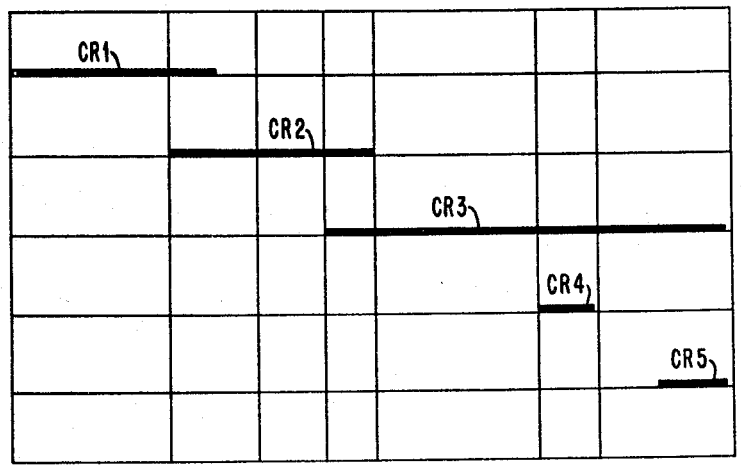

FIG. 6 is a timing diagram of the circuit controlled cams.

The schematic of FIG. 1 shows the invention in simplified form. A timing shaft (not shown), is provided on which are mounted in any well known manner circuit closure cams CR-1, 2, 3, 4 and 5. Cams CR-1, 2 and 3 control in overlapping sequence, as shown in FIG. 6, circuits to provide positive potential to letter networks or matrices 10, 11 and 12. The circuits of each matrix are controlled by card or tape readers 6, 7 and 8 and are connected to the LETTER hubs 14 of a plugboard such as 15. Secured to each of the RELAY hubs 16 of each plugboard is one coil of a three coil relay such as relay 41, the energizing of any winding of which would close all contacts associated therewith. In order to identify the three windings of these relays they will hereinafter be designated by the letter, the signal for which is connected through the plugboard from the matrix to that particular winding. The matrix 11 is connected through a plugboard 18 to the second coil of a relay such as relay 41 and the third matrix 12 is similarly connected through plugboard 20 to the third coil of a relay such as relay 41. Other RELAY hubs of these plugboards are connected to the coils of the ADE relays 42, BAC relay 43, CAB relay 44, etc. It is understood that the windings of each relay are wired through the plugboard in such manner that one and only one relay can be actuated by a predetermined sequence of signals providing the signals are received in sequence to operate the first, second and then third coils of each relay.

If, for example, it is desired to select the ABC relay 41 a signal will be given setting up circuits in sequence through each of the matrices to connect to the A, B and C windings of that particular preselected relay in sequence. Specifically, when the reader 6 senses the code for an A, circuits will be set up in the matrix 10 which will be completed from positive through cam CR-1 through matrix 10 to the LETTER hub A and thence over cord 25 to the number 1 RELAY hub and thence through the A coil of ABC relay 41 and also over cord 28 to the A coil of the ADE relay 42, thence over a common through the contacts 30-1 of the test relay 30 to negative. This circuit will operate relays 41 and 42. These relays close their contacts 41-1 and 2, and 42-1 and 2. Contact 41-1 prepares a circuit to the second coil of the relay and contact 41-2 prepares a similar circuit to the third coil.

Reader 7 will select a circuit through matrix 11 to the LETTER hub B of the plugboard 18 which will be completed from positive through the hub B and over cord 31 to the number 1 hub through contact 41-1, through the B winding of the ABC relay 41 to negative current through the shunt contact of the test relay 30. This circuit holds the contacts 41-1 and 2 closed, holding relay 41 operated and maintaining the prepared circuit for the C coil of the relay. However, as soon as CR-1 opens, which is shortly after CR-2 closes, the ADE relay 42 releases since there is no circuit for the D coil. This will open the contacts 42-1 preventing any circuit from being completed to the ADE relay 42 during this cycle.

Reader 8 sets up a circuit through matrix 12 which will be completed by cam CR-3 from positive through matrix 12 to LETTER hub C of plugboard 20, thence over cord 33, through the number 1 RELAY hub 1, through contact 41-2 to negative through winding C of relay 41 in series with the shunt contact 30-1 and P-1 winding of TEST relay 30. This circuit will operate and hold the ABC relay 41 but will not operate the TEST relay 30.

During the time that CR-3 is holding relay 41 operated a circuit is closed from positive through CR-4, winding P-2 of relay 30 to negative operating relay 30. This will open the shunt contact 30-1 and close contact 30-2. This will permit current to flow through the P-1 winding thus holding the relays 41 and 30 operated. The closure of contact 30-2 will prepare a circuit for lighting a lamp 34. The lamp circuit is completed by contact CR-5 which closes after CR-4 time and continues through CR-3 time (see FIG. 6). However, should no current be flowing through P-1 winding (indicating that none of the relays ABC, ADE, etc., have been operated) the contacts 30-1 will close at the end of CR-4, contacts 30-2 will be open, thus indicating a failure to pick one of the letter relays. If no current were flowing through CR-3, matrix 12, the third coil of any three coil relay and now P-1 winding of relay 30, relay 30 would release at the end of CR-4 time and there would be no circuit at CR-5 time to light lamp 34.

It will be noted that C winding of relay 43 may also be connected by a cord 36 to the number 3 and number 1 hubs of plugboard 20 and thence to the C hub from the matrix 12. The above circuit through hub C would normally operate the relay 43, but since its first winding was connected to the B hub of board 15 from matrix 10 and there was no circuit for the first winding, contacts 43–1 and 43–2 were not closed and in consequence no circuit can be established for the C winding of this relay at this time.

Figure 3:
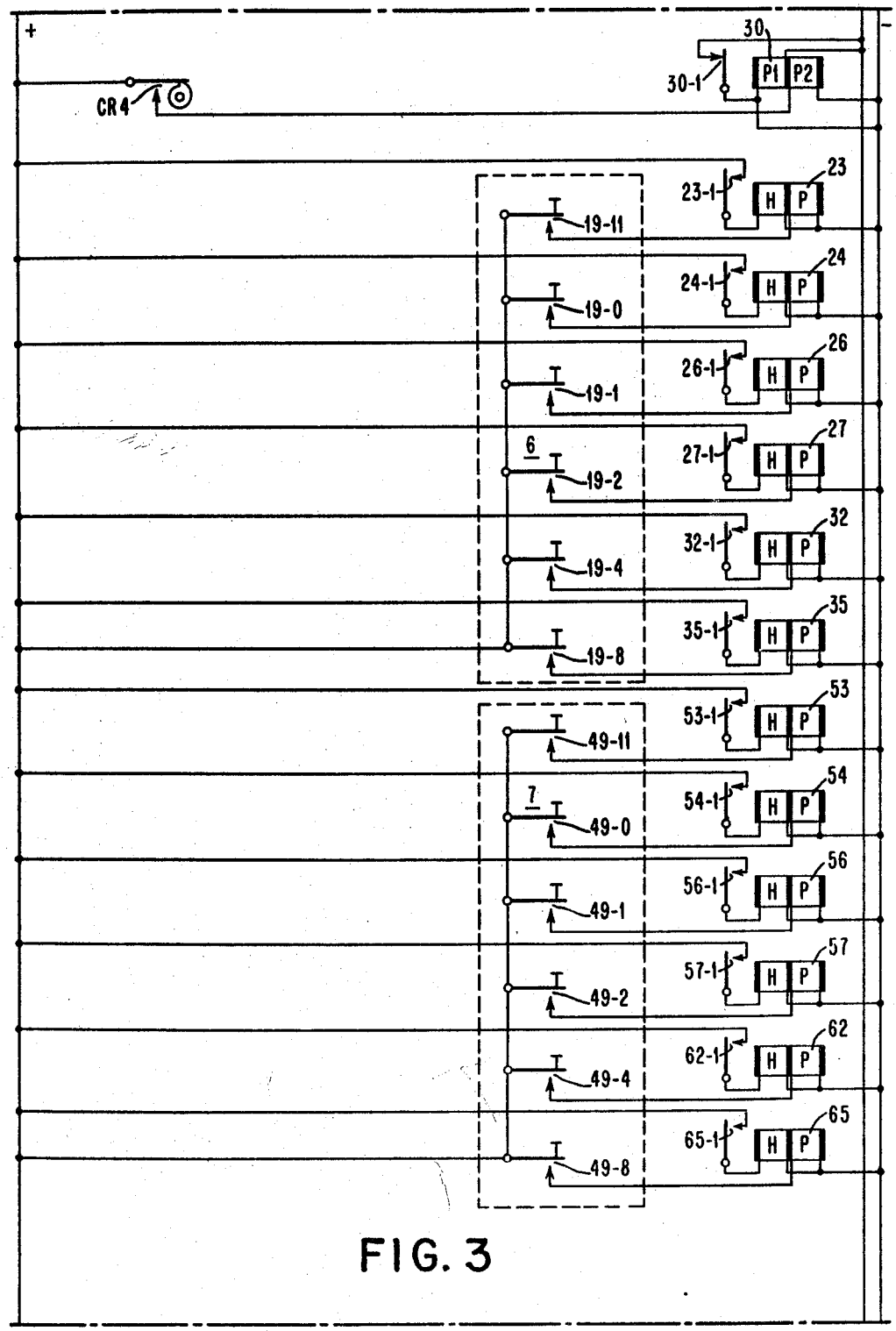

The circuits described above are shown in more detail in FIGS. 2–5 inclusive of which FIGS. 2 and 4 cover the decoding or matrix circuits for setting up a circuit to a particular LETTER hub. FIG. 3 shows the two readers 6 and 7 for sensing a binary code using 11, 0, 1, 2, 4, 8 indices. For example, an A would be represented on the record medium by indices 11, 0 and 1. It is obvious, however, that these signals can be entered by a keyboard, card or tape reader, or any other well known data entry means. The closure of reader contacts (FIG. 3) 19–11, 19–0 and 19–1 will operate relays 23, 24 and 26 in the matrix 29 of FIG. 2, over a circuit from positive contacts 19–11, 19–0 and 19–1 through the pick coils of the relays to negative. These relays will be held up to negative through their H coils and 23–1, 24–1 and 26–1 contacts respectively. The operation of relays 23, 24 and 26 will close a circuit from positive through cam contacts CR–1 (FIG. 2), make contacts 23–2, 24–2 and 26–2, thence through the break contacts 27–2, 32–3 and 35–2, to hub A on the plugboard 15. Hub A is plugged to the number 1 hub over cord 39 and thence to the winding A of the ABC relay 41. When CR–1 closes relay 41 will operate in series through the shunt contacts 30–1 of the test relay 30 to negative, closing its contacts 41–1 and 41–2 to complete the circuits for the next two relay coils in the sequence set-up. A circuit is also closed through the P–1 coil of relay 30 which does not operate at this time due to shunt contact 30–1. This is not the only circuit that can be completed at this time as the hub A is also plugged to the number 2 hub of plugboard 15 which completes a circuit over cords 39 and 36 through the A coil of the ADE relay 42. This relay closes its contacts 42–1 and 42–2 and sets up circuits for its other two windings which may or may not be completed later.

Figure 4:
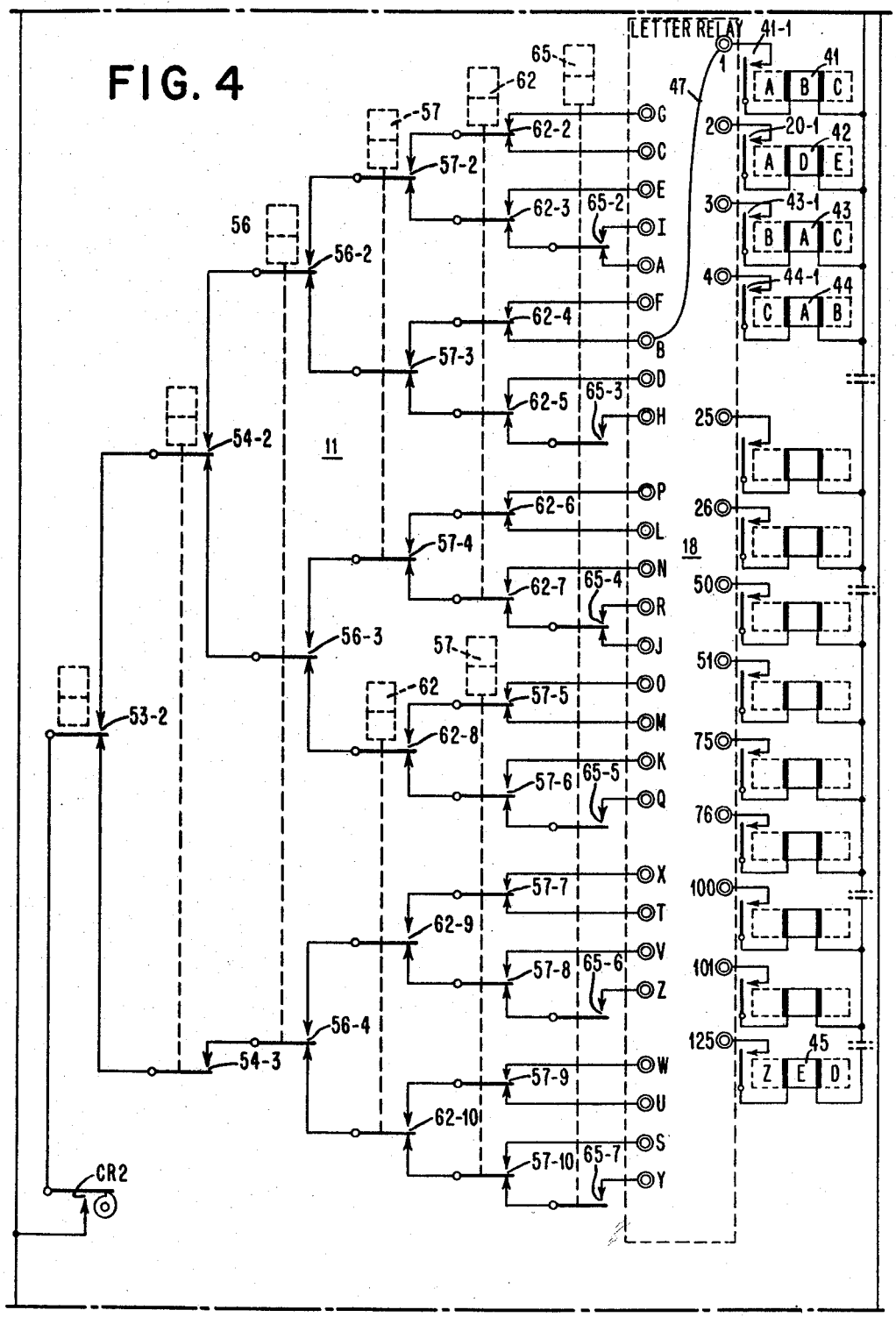
Figure 5:
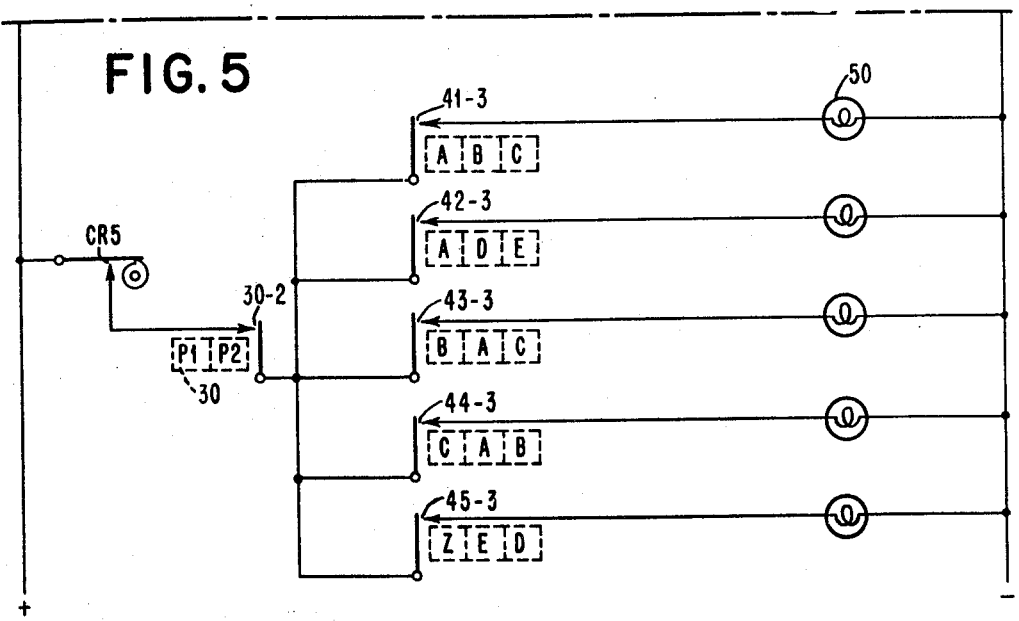

In a second reader 7 (FIG. 3) the signal sensed is a B, the code for which is 11, 0, 2 and which will close contacts 49–11, 49–0 and 49–2 to operate relays 53, 54 and 57 respectively in the matrix 11 (FIGS. 3 and 4). A circuit is now completed from positive through CR–2, make contacts 53–2, 54–2, break contacts 56–2, make contact 57–3 and break contact 62–4, to the LETTER hub B of the plugboard 18 thence over cord 47 through the number 1 RELAY hub, through the contact 41–1 which has been previously closed, to the B winding of the relay 41 and thence through the shunt contact 30–1 of the test relay 30 to negative. This will hold the relay 41 operated, but since no circuit is completed through the B hub to any other relay, at this time the relay 42, which was formerly operated, will now be released due to opening of the CR–1 contacts.

The next letter to be sensed in sequence is the letter C which will close relays in a third matrix similar to matrices 10 and 11 and will be plugged to the C winding of the relay 41. Since the detail circuits are the same as those described above for the letter B and those of FIG. 1 no showing has been meade of the specific circuit. However, upon closure of the contact similar to CR–3 the circuit is completed as shown in FIG. 1 and described above through the matrix and plugboard and thence through the C winding of the relay 41 and contact of the test relay 30 to negative thus holding relay 41 operated.

Relay 30 has two coils P–1 and P–2. P–1 has been described above as being in series with the coils of the three coil relays but is prevented from operating by the shunt contact 30–1. When CR–4 is closed a circuit is completed direct from positive to negative through the P–2 coil of relay 30 operating the relay and thus opening the shunt contacts 30–1. The circuit through CR–3 and the third coil of any one of the three coil relays in series with the P–1 coil of the test relay 30 will hold both relays until CR–3 is opened. Contact 30–2 of the test relay prepares a circuit for a lamp 34 which will be lighted during CR–5 time if a three coil relay such as ABC has been picked. If not, the lamp will not light when CR–5 is operated.

Operation of relay 41 closes its contact 41–3 (FIG. 5) which is in circuit with a lamp 50 on an indicator board and indicates that a work circuit has been selected and completed by the relay. This work circuit may be assigned to a punch, a calculator, or a telegraph line for use with such machines as the Cardatype.

It will be seen from the above that if the matrices 10, 11 and 12 are correctly wired through the plugboards 15, 18 and 20 that one and only one three coil relay can be operated by a preselected sequence such as ABC. A sequence ACB or ADE could be started since all so-called A coils in the first sequence would be wired to the matrix. The A coils would close the relay contacts and prepare circuits to the second coil of each relay. However, since the second letter to be sensed is a B and would not be wired to the C coil of the relay ACB this relay would drop out as soon as CR–1 opens which is shortly after CR–2 has completed a circuit to the second coil of all relays wired to the B LETTER hub.

In other words, there is only one relay out of a plurality of relays that can be operated by signals received in sequence by the plurality of windings of a specific relay. The indication that a relay has been selected is given by the operation of a test relay having two coils, one of which is in series with the last activated coil of the selected relay but which cannot operate the test relay until a contact maintaining a shunt around that coil is removed by the energization of the second coil of the test relay. The continuous operation of the test relay after the second coil has been deenergized is an indication that current is flowing through a selected relay holding it operated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a circuit for individually testing a plurality of multi coil relays;
   a dual coil test relay;
   one coil of said dual coil test relay being connected in series with one of the coils of each multi coil relay;
   a contact of said test relay shunting said one coil; and
   means for actuating the second coil of said test relay, whereby said contact is opened removing the shunt from said first coil permitting said coil to maintain said test relay operated thereby indicating current flow in at least one of said multi coil relays.

2. In a circuit for individually testing any one of a plurality of multi coil relays;
   a dual coil test relay having two contacts;
   a common lead connecting all of said multi coils and one coil of said test relay in series;
   one contact of said test relay shunting said one coil;
   circuit closing means for activating the second coil of said test relay whereby said contact is opened removing the shunt from said first coil permitting said coil to hold said test relay actuated; and
   a signal controlled by said second contact to indicate a current flow in one of said multi coil relays.

References Cited in the file of this patent

UNITED STATES PATENTS 2,700,125   King et al. _____ Jan. 18, 1955